United States Patent [19]

Takagi et al.

[11] Patent Number: 5,986,989
[45] Date of Patent: Nov. 16, 1999

[54] METHOD FOR PROCESSING THE OUTPUT SIGNALS OF AN OPTOELECTRONIC SCANNER IN A REPLAY OR RECORDING APPLIANCE, AND A CORRESPONDING APPLIANCE

[75] Inventors: Hirohito Takagi, Chiba; Heinrich Schemmann, Villingen-Schwenningen, both of Japan

[73] Assignee: Deutsche Thomson-Brandt GmbH, Villingen-Schwenningen, Germany

[21] Appl. No.: 08/920,763

[22] Filed: Aug. 29, 1997

[30] Foreign Application Priority Data

Sep. 23, 1996 [DE] Germany ............... 196 38 879

[51] Int. Cl.$^6$ ............................................. G11B 7/00
[52] U.S. Cl. ..................... 369/59; 369/44.34; 369/44.41
[58] Field of Search ................................... 369/59, 47, 48, 369/49, 50, 54, 58, 32, 124, 44.27, 44.28, 44.34, 44.25, 44.41, 44.37

[56] References Cited

U.S. PATENT DOCUMENTS

| | | |
|---|---|---|
| 4,933,922 | 6/1990 | Yokogawa . |
| 4,972,398 | 11/1990 | Wachi . |
| 5,065,386 | 11/1991 | Takeya et al. . |
| 5,293,369 | 3/1994 | Melas et al. . |
| 5,627,805 | 5/1997 | Finklestein et al. ............ 360/50 X |
| 5,701,283 | 12/1997 | Alon et al. ............... 369/44.41 |

FOREIGN PATENT DOCUMENTS

| | | |
|---|---|---|
| 0465 015 A1 | 1/1992 | European Pat. Off. . |
| 3901 574 A1 | 7/1990 | Germany . |
| 01 283607 | 11/1989 | Japan . |
| 02 113478 | 4/1990 | Japan . |

OTHER PUBLICATIONS

\* Patent Abstracts of Japan, vol. 14, No. 59 (P–1000), Feb. 2, 1990 (Matsushita Electric Ind. Co.).
\*\* Patent Abstracts of Japan, vol. 14, No. 333 (P–1078), Jul. 18, 1990 (Sony Corp.).
S. Matsukawa et al., "An Advanced Sector Servo Using A Learning, Estimating and Over–Sampling Method for a 3.5 28 Mbyte FDD", IEEE Transactions on Magnetics, vol. 27, No. 6, pt. 1, Nov. 1991, pp. 4484–4489.
EPO Search Report dated: Sep. 29, 1998.

*Primary Examiner*—Muhammad Edun
*Attorney, Agent, or Firm*—Joseph S. Tripoli; Peter M. Emanuel; Paul P. Kiel

[57] ABSTRACT

A method is specified for processing the output signals A to F of an optoelectronic scanner (3) in a replay or recording appliance for replaying from or recording onto an optical recording medium having the following method steps: as well as an appliance with a corresponding input circuit of a digital servo controller: first of all, the output signals A to F are supplied directly to an A/D converter (2) without the interposition of a low-pass filter, and are digitized with n-times oversampling. The digitized output signals are then supplied to a k-th order comb filter (4) by means of which undersampling of the signals to the normal sampling frequency (44.1 kHz) is carried out. After this, the undersampled output signals A' to F' of the comb filter (4) are supplied to a trimming and correction circuit (6) in which trimming and correction, of OFFSET and BALANCE are respectively carried out. Finally, the trimmed/corrected output signals A" to F" are supplied to the trimming and correction circuit of a digital servo circuit (1), by means of which a focusing error signal (FE) and a track deviation error signal (TE) are produced.

10 Claims, 3 Drawing Sheets

METHOD FOR PROCESSING THE OUTPUT SIGNALS OF AN OPTOELECTRONIC SCANNER IN A REPLAY OR RECORDING APPLIANCE, AND A CORRESPONDING APPLIANCE

BACKGROUND OF THE INVENTION

The present invention relates to a method for processing the output signals of an optoelectronic scanner in a replay or recording apparatus for replaying from or recording onto an optical recording medium, as well as a corresponding appliance having an input circuit of a digital servo controller, suitable for carrying out the method.

Both such a method and the said appliance having an input circuit of a digital servo controller have been known for some time as components of optical disk drives for CDs, magneto-optical disks, CD-Roms, digital video disks etc. In this case, the servo controller is used to ensure that the laser beam which scans the optical recording medium always follows the track of the pits on the recording medium accurately and, despite the optical recording medium having a certain amount of unevenness which cannot be avoided, eccentricity or other disturbance influences are focused at any time with adequate precision onto the information-bearing layer of the recording medium. In the case of the known methods and the corresponding appliances, the output signals of the scanner are first of all supplied to an analogue circuit with a low-pass filter and a trimming and correction circuit, and the focus error signals resulting from this, as well as the track error signals which characterize a track deviation are then digitized at the normal, fundamental sampling frequency of 44.1 kHz or else at twice the sampling frequency, which is likewise normal, of 88.2 kHz in an analogue/digital converter, called an A/D converter in the following text. After this, the digitized signals are made available to the digital servo controller as input values.

The disadvantages of the known method and of the corresponding known appliance are, in particular, that the analogue low-pass filter is essential for suppressing high frequency components, e.g. radio-frequency components, of the two error signals, and that the necessary trimming or the corrections required of OFFSET and BALANCE must be carried out in a relatively complex manner in the analogue domain. The known method and the corresponding circuit of a known appliance possibly require a number of stages of analogue low-pass filters before the A/D conversion, and trimming or correction can be carried out digitally only if each output signal of the optical scanner is digitized separately. Thus, neither the known method nor the corresponding appliance is optimum for integration of a decoder and of a digital servo section, containing an A/D converter and a digital servo controller, e.g. using CMOS technology.

SUMMARY OF THE INVENTION

The object of the present invention is to design a method for processing the output signals of an optoelectronic scanner in a replay or recording appliance for replaying from or recording onto an optical recording medium, as well as an appliance having a corresponding input circuit of a digital servo controller, in such a manner that external components on the input side of the digital servo controller are very largely avoided and, at the same time, the capability for automatic or manual trimming, and automatic or manual corrections, is retained.

The comb filter which is used according to the invention is also called a moving time average (MTA) filter in the specialist literature and is used in a known manner for undersampling, or so-called down sampling, of a modulation signal, which has been digitized by means of oversampling, to any given lower sampling frequency. In the case of the method according to the invention and of the corresponding input circuit of the servo controller of the appliance according to the invention, the signals at the higher sampling rate are thus changed by undersampling to a lower rate, which is sufficient for the digital tracking and focusing servo control. This means, first of all, that, because of the higher sampling frequency, all the output signals of the optoelectronic scanner, which has a bandwidth, for example, of about 700 kHz, can be digitized directly without any analogue low-pass filters. Independent processing of the digitized output signals of the scanner allows certain automatic digital trimming or correction processes, for example OFFSET and BALANCE, to be carried out on the output signals in a simple manner, before a track deviation error signal and a focus error signal are obtained.

The method according to the invention and the corresponding appliance have a large number of advantages. On the one hand, not only are fewer analogue components required for implementation, but, in addition, no analogue components are required in the signal path between the optical scanner and an integrated circuit, also called an IC in the following text, of the digital servo section, which may have an A/D converter, comb filter, trimming and correction circuit, digital servo controller and decoder, so that the output signals of the scanner can be fed directly to the IC. To this extent, the solution according to the invention offers an optimal configuration for the design of ICs for optical disk drives. On the other hand, the oversampling provides higher resolution of the digital servo signals downstream of the A/D converter, a fact which can be used, for example, to reduce the resolution of the A/D converter somewhat, and thus to allow it to be designed more cost-effectively. Furthermore, thanks to the fully digital processing method, simple, automatic trimming/correction of the gain and of the OFFSET of each scanner output signal is possible. For example, in the case of the known 3-beam method for tracking and focusing control, six different output signals A,B,C,D,E,F, are supplied from the optical scanner. Thanks to the solution according to the invention, only separate signals are now fed to the digital signal processor, after undersampling using the comb filter. These separate signals are advantageously the signals A",B",C",D",E",F" which correspond to the output signal A,B,C,D,E,F, and are sampled and filtered according to the invention. According to an advantageous refinement of the invention, signals which have already been partially pre-processed, for example sum signals A+C and B+D, are supplied to the comb filter. This has the advantage that, if they require uniform OFFSET and/or BALANCE trimming or corresponding correction, there is no necessity for two independent trimming operations or corrections for the individual signals. The digital signal processor is supplied with the said separate signals instead of the normal track deviation and focus error signal. This is particularly advantageous since, as is known, the gain and the OFFSET for the output signals of any optical scanner differ because of its alignment, for which reason trimming is absolutely essential for better tracking. Finally, it is advantageous that, with the solution according to the invention, the input of the A/D converter does not require any matching to achieve a desired resolution. In the case of the IC of the appliance according to the invention, the E and F output signals of the scanner are digitized separately from one another in the A/D converter. This means that there is no amplitude difference whatsoever between the output signal when the circuit is open and that when it is closer. There is therefore no need for any matching of the input of the A/D converter.

Advantageous developments of the method and of the corresponding appliance are specified in the subclaims.

The digitization of the output signals of the scanner is preferably carried out with 48-times oversampling (n=48), so that the resultant sampling frequency of 48*44.1 kHz is sufficiently well above the Nyquist frequency, since the bandwidth of the output signal of the scanner is in general up to about 700 kHz.

In many cases, the tracking control operates using the so-called 3-beam method, six different output signals A,B,C,D,E,F, being provided by the optical scanner. According to a development of the method according to the invention, sum signals (A+C, B+D) are formed from these, are then digitized at the said sampling frequency, and are subjected to the further method steps.

According to one advantageous refinement of the invention, the circuitry of a comb filter is split into an IIR filter section, a so-called infinite impulse response filter, and into an FIR filter section, a so-called finite impulse response filter, each of which comprises a number k of memory modules, k being the order number of the comb filter. It is preferably provided, in a development of the method according to the invention, that a memory module of the IIR section of the comb filter is reset by means of an RESET command after in each case n sampling processes. The advantage which can be achieved in this way is that one FIR filter stage may be omitted, which means that the centre stage of the resulting improved comb filter carries out both the function of the IIR filter stage and that of the FIR filter stage, and an IIR filter structure is in this case retained. If, for example, a second order comb filter (k=2) is used, which in consequence has two IIR and two FIR filter stages, the centre stage of the resulting filter carries out the function of the second IIR filter stage and of the first FIR filter stage and at the same time still has an IIR filter structure. The RESET command according to the invention is carried out with 48-times oversampling after in each case 48 sampling processes. This means that the resulting IIR/FIR filter stage can add the incoming signals 48 times in the memory module as an integrator and, once the added-on signal has been buffer-stored in the last memory module using CLOCK 1/48, that is to say using a clock whose frequency corresponds to 1/48 of the clock frequency of the oversampling, the contents of the memory module in the IIR/FIR filter stage are reset by a RESET command, which is likewise produced with a clock whose frequency corresponds to 1/48 of the clock frequency of the oversampling.

The present invention is not only limited to the said 3-beam method for tracking control, but can be used just as advantageously in corresponding appliances which operate using a different tracking method.

BRIEF DESCRIPTION OF THE DRAWINGS

A preferred exemplary embodiment of the invention will be explained in more detail in the following text with reference to drawings, in which.

DETAIL DESCRIPTION OF THE PREFERRED EMBODIMENT

Figure 1:
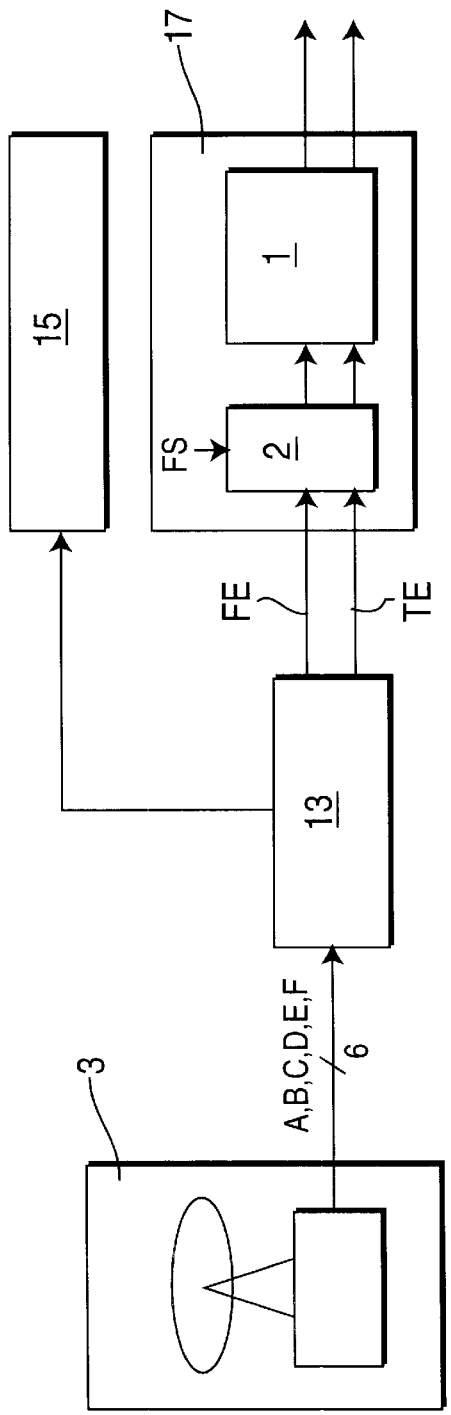
FIG. 1 shows an input circuit of a digital servo controller.

FIG. 1 shows the circuit layout of an input circuit of a digital servo controller 1 for processing the output signals A to F of an optoelectronic scanner 3 in a replay or recording appliance for replaying from or recording onto an optical recording medium. This assumes tracking control using the normal 3-beam method, in which the scanner 3 supplies six different output signals A to F. In this case, the signals A, B, C and D are used to obtain a focus error signal and an information signal, while the signals E and F are used to form a track error signal. The corresponding design of the scanner 3 and the 3-beam method are sufficiently known and thus do not need to be explained in more detail here. The output signals A to F of the scanner are first of all supplied to an analogue circuit 13, which contains a trimming and correction device and at least one low-pass filter. This analogue circuit 13 is connected in a known manner to a decoder 15, which converts the signal emitted from the scanner 3 into an information signal. A focus error signal FE=(A+C)−(B+C) and a track error signal TE=E−F, which corresponds to the track deviation, are provided at the output of the analogue circuit 13 and are supplied to an analogue/digital converter 2, called an A/D converter in the following text. The A/D converter 2 is a component of a digital servo section, whose essential components, in addition to the A/D converter 2, include the digital servo controller 1. The focus error signal FE and the track error signal TE are digitized in the A/D converter 2 at a normal sampling frequency of 44.1 kHz, or else at twice the normal sampling frequency, that is to say at 88.2 kHz, and are then supplied to the digital servo controller 1, for further signal processing. The analogue circuit 13 and, in particular, the low-pass filter contained in it are indispensable in this input circuit for a digital servo controller, in order to suppress radio-frequency components of the error signals FE, TE.

Figure 2:
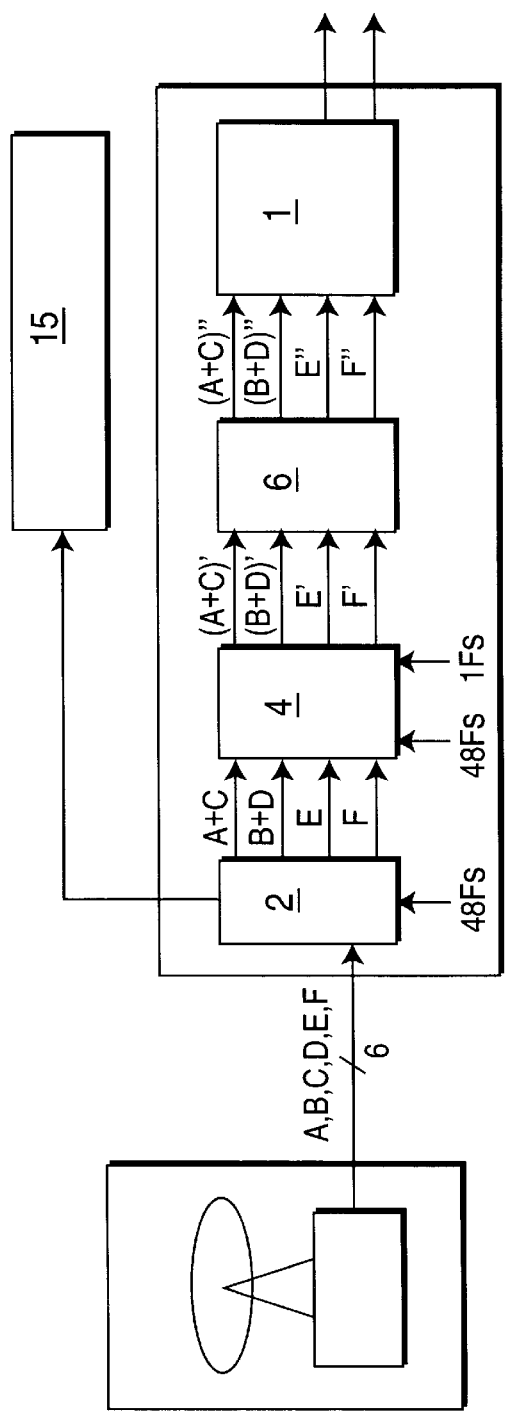
FIG. 2 shows an input circuit of a digital servo controller of an appliance according to the invention.

FIG. 2 shows the circuit layout of an improved input circuit of a digital servo controller 1 of an appliance according to the present invention. In contrast to the input circuit according to FIG. 1, the output signals are supplied as sum signals A+C, B+D, E and F directly, that is to say without any interposition of an analogue circuit, to the A/D converter 2 as input signals. In the A/D converter 2, the input signals A to F are digitized with 48-times oversampling, that is to say at a sampling frequency of 48*44.1 kHz, which is sufficiently above the Nyquist frequency. After this, the digitized signals A to F are supplied to a second order comb filter 4, where they are subjected to undersampling from 48-times the sampling frequency to the fundamental sampling frequency (44.1 kHz), a procedure which is sufficient for the digital focusing and tracking servo control. Sum signals (A+C)', (B+D)', E' and F' are thus provided at the output of the comb filter and are supplied to an automatic trimming and correction device 6 for trimming and correcting OFFSET and BALANCE, respectively.

Finally, the focus error signal FE and the track error signal TE are obtained from the trimmed and corrected signals (A+C)", (B+D)", E" and F", using the following generally known equations, within the digital servo controller:

$$FE = (A+C)'' - (B+D)'' \quad \text{(Equation 1)}$$

$$TE = E'' - F'' \quad \text{(Equation 2)}$$

$$(A+C)'' = [(A+C)' - \text{OFFSET1}] * \text{BALANCE1}$$

(B+D)"=[(B+D)'−OFFSET2]*BALANCE2
E"=(E'−OFFSET3)*BALANCE3
F"=(F'−OFFSET4)*BALANCE4

In this case, OFFSET1, OFFSET2, OFFSET3, OFFSET4 are parameters for the OFFSET correction and BALANCE1, BALANCE2, BALANCE3, BALANCE4 are parameters for the BALANCE correction.

Figure 3:
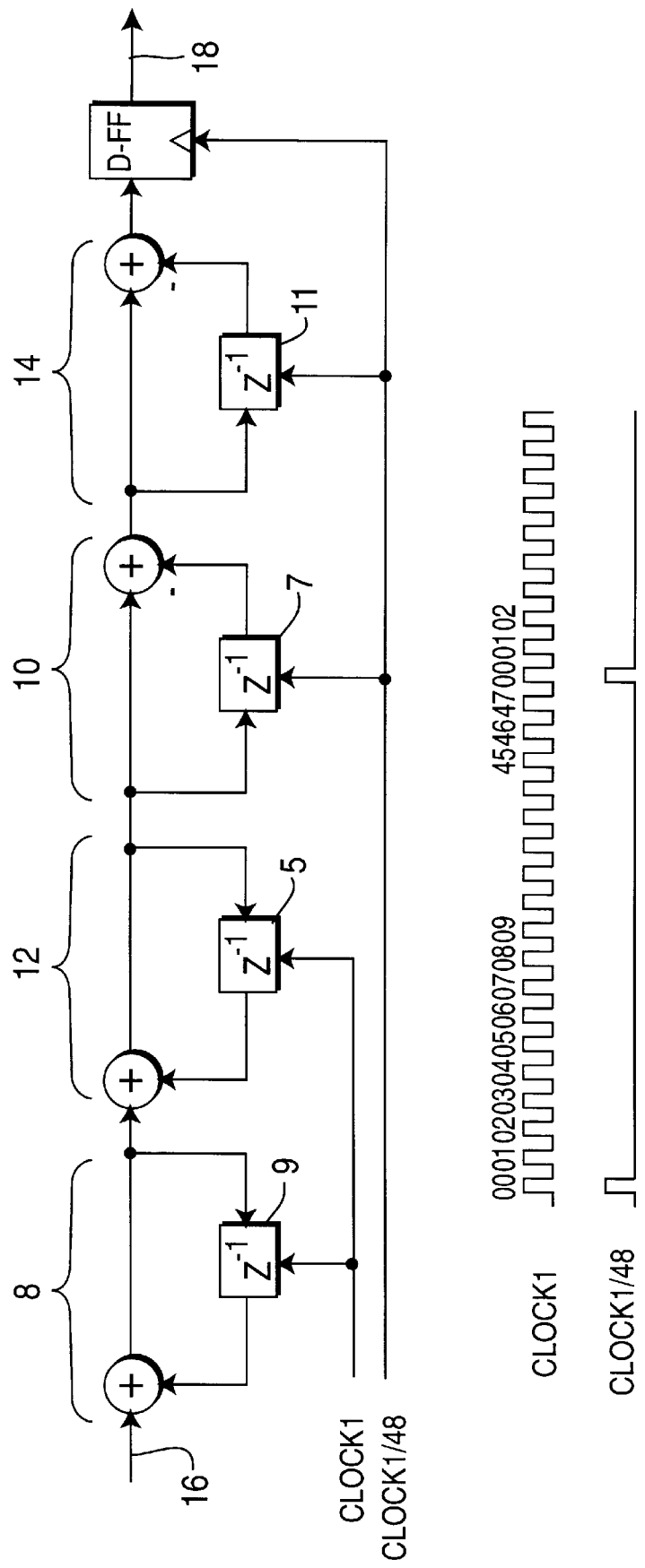
FIG. 3 shows a second order comb filter with undersampling.

FIG. 3 shows a detailed block diagram of a k-th order comb filter, which is also called a moving time average (MTA) filter occasionally in the specialist literature. Arranged between the filter input 16 and the filter output 18 there are four memory modules 5, 7, 9, 11 which, by way of example, are D-flipflops with the transfer function $Z^{-1}$. The filter, and thus its transfer function, are split into an infinite impulse response filter section, also called IIR and comprising a first IIR filter stage 8 and a second IIR filter stage 12, and into a finite impulse response filter section, also called FIR and comprising a first FIR filter stage 10 and a second FIR filter stare 14.

The general transfer function of such a filter can be expressed by the following equation:

$$\left(\sum_{i=0}^{N-1} z^{-1}\right)^k = \frac{1}{N} * \left(\frac{1-z^{-N}}{1-z^{-1}}\right)^k \qquad \text{(Equation 3)}$$

where
N=undersampling factor and
k=order of the filter.

The transfer function of the second order comb filter 4 with undersampling from 48-times the sampling frequency to the fundamental sampling frequency is as follows:

$$(Z^{-0}+Z^{-1}+Z^{-2}+\ldots+Z^{-46}+Z^{-47})^2 \qquad \text{(Equation 4)}$$

Substituting Equation 3 in Equation 4 gives, $$\left(\frac{1-z^{-48}}{1-z^{-1}}\right)^2$$

This comb filter 4 carries out the undersampling while maintaining the signal-to-noise ratio of more than 8 bits, which is sufficient for the digital servo application in optical disk drives. Furthermore, 2.7 bits are obtained in addition by the 48-times oversampling, that is to say an additional resolution downstream of the A/D converter, for which reason, or example, the resolution of the A/D converter can be designed to be lower.

In the exemplary embodiment, the clock signal for sampling the signals emitted from the optical scanner is called CLOCK 1, and the clock signal for every 48th sample is called CLOCK 1/48.

Figure 4:
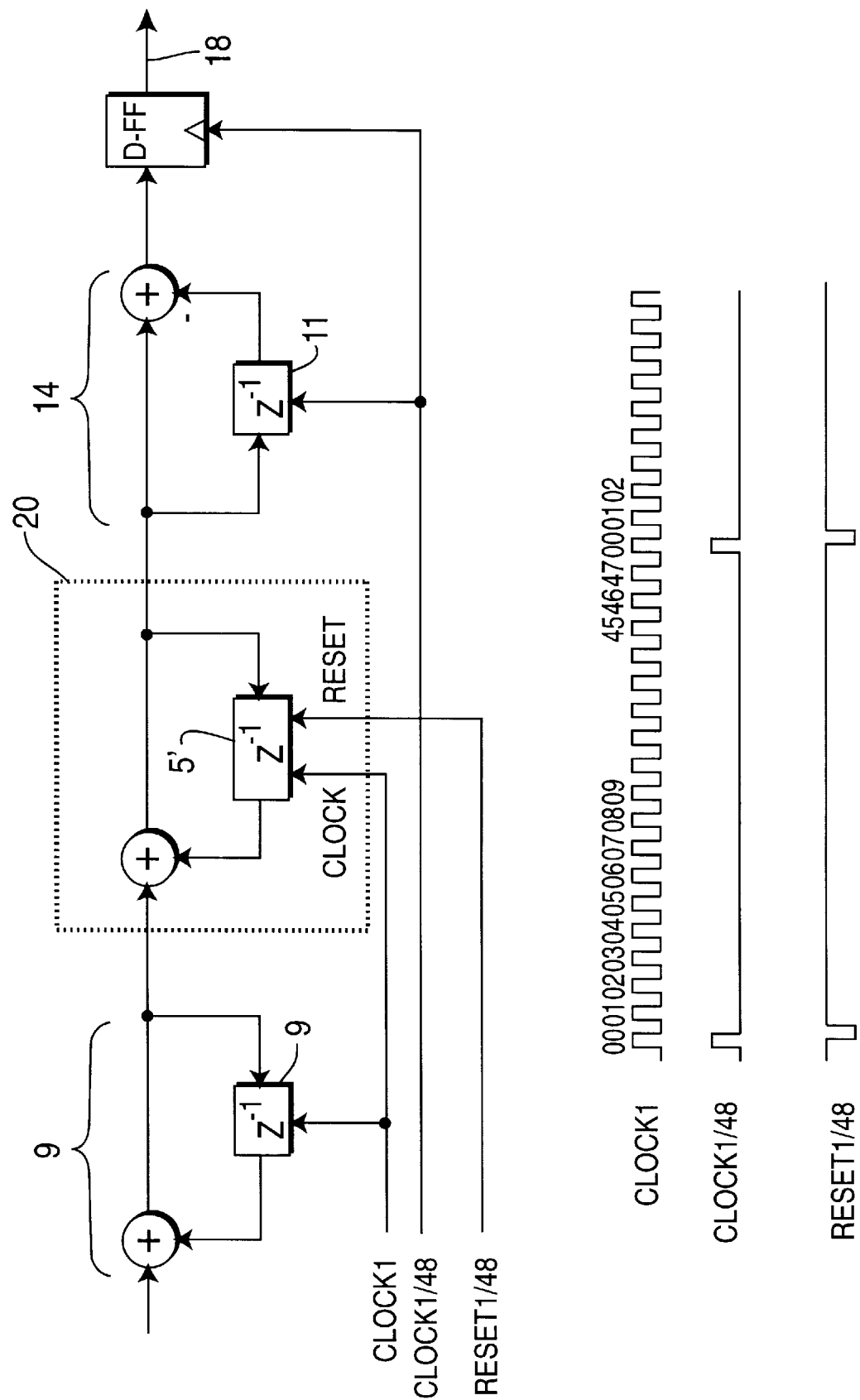
FIG. 4 shows an optimized design of the comb filter according to FIG. 3.

FIG. 4 shows a detailed block diagram of an improved second order filter of an appliance according to the invention, which differs from the comb filter according to FIG. 3 in that a memory module 5' in the IIR filter section is reset by a RESET command after every 48 sampling processes. By means of this RESET function, the memory module 5' carries out the function of the second IIR filter stage 12 and of the first FIR filter stage 14 (see FIG. 3), so that an IIR/FIR filter stage 20 can be formed with an IIR filter structure. The memory module 7 in the first FIR stage 10 can thus be omitted.

Since the RESET command takes place after every 48 sampling processes, the IIR/FIR filter stage 20 can add the incoming signals in the memory module 5' 48 times as an integrator and, once the added-up signal has been buffer-stored in the last memory module with CLOCK 1/48, the contents of the memory module 5' in the IIR/FIR filter stage are reset by the RESET command.

To summarise, a method is specified for processing the output signals A to F of an optoelectronic scanner (3) in a replay or recording appliance for replaying from or recording onto an optical recording medium having the following method steps: as well as an appliance with a corresponding input circuit of a digital servo controller: first of all, the output signals A to F are supplied directly to an A/D converter (2) without the interposition of a low-pass filter, and are digitized with n-times oversampling. The digitized output signals are then supplied to a k-th order comb filter (4) by means of which undersampling of the signals to the normal sampling frequency (44.1 kHz) is carried out. After this, the undersampled output signals A' to F' of the comb filter (4) are supplied to a trimming and correction circuit (6) in which trimming and correction, of OFFSET and BALANCE are respectively carried out. Finally, the trimmed/corrected output signals A" to F" are supplied to the trimming and correction circuit of a digital servo circuit (1), by means of which a focusing error signal (FE) and a track deviation error signal (TE) are produced.

What is claimed is:

1. Method for processing output signals (A,B,C,D,E,F) of an optoelectronic scanner (3) in a replay or recording appliance for replaying from or recording onto an optical recording medium, characterized by the following method steps:

a) the output signals (A,B,C,D,E,F) are supplied directly to an analogue/digital converter (2) and are digitized with n-times oversampling, b) the digitized output signals (A,B,C,D,E,F) of the scanner are supplied to a k-th order comb filter (4) which carries out undersampling of the signals to the normal sampling frequency, to produce undersampled output signals (A', B', C', D', E', F'), c) the undersampled output signals (A',B',C',D',E', F') of the comb filter (4) are supplied to a trimming and correction circuit (6) in which trimming and correction, of OFFSET and BALANCE are respectively carried out, to produce trimmed/corrected output signals (A", B", C", D", E", F"), and d) the trimmed/corrected output signals (A",B",C", D",E", F") of the trimming and correction circuit (6) are supplied to a digital servo circuit (1) of which a control signal of a focusing control loop or of a tracking control loop is produced.

2. Method according to claim 1, characterized in that the output signals (A,B,C,D,E,F) of the scanner (3) are digitized with 48-times oversampling.

3. Method according to claim 1, characterized in that the optoelectronic scanner (3) operates with three scanning beams and supplies corresponding different output signals (A,B,C,D,E,F), sum signals (A+C, B+D) being formed and being subjected to method steps a) to d).

4. Method according to claim 3, characterized in that the focus error signal is formed from the difference between trimmed and corrected sum signals ((A+C)" and (B+D)"), and the track error signal is formed from the difference between trimmed and corrected output signals (E", F").

5. Method according to claim 1, characterized in that, in a comb filter (4) whose transfer function is split into an IIR part and a FIR part, a memory module (5') of the IIR part of the comb filter (4) is reset after in each case n sampling processes by means of a RESET command.

6. Replay or recording appliance for replaying from or recording onto an optical record ng medium having an optoelectronic scanner (3), a digital servo controller (1), which has an input circuit, for processing an output signal (A,B,C,D,E,F) of the optoelectronic scanner (3), characterized in that the appliance has an analogue/digital converter (2) to which the output signals (A,B,C,D,E,F) of the scanner (3) are supplied and by which these output signals are digitized with n-times oversampling, a k-th order comb filter (4) to which digitized output signals (A,B,C,D,A+C,B+D, E,F) of the analogue/digital converter (2) are supplied as input signals and which provides undersampled output signals (A', B', C', D',(A+C)', (B+D)',E',F'), and a trimming and correction circuit (6) to which time undersampled output signals (A',B',C', D',(A+C)',(B+D)', E',F'), are supplied as input signals and which provides trimmed and/or corrected output signals (A'',B'',C'',D'',(A+C)'',(B+D)'',E'',F''), which are made available to the digital servo controller (1) as input signals.

7. Appliance according to claim 6, characterized in that the comb filter (4) contains a first IIR filter stage (8) to which a first FIR filter stage (10) is connected.

8. Appliance according to claim 7, characterized in that the comb filter (4) contains a memory module (5') whose contents can be reset by a RESET command.

9. Appliance according to claim 8, characterized in that the resettable memory module (5') is part of the IIR filter stage (8).

10. Appliance according to claim 9, having a second order comb filter (4) with two IIR and two FIR filter stages, characterized in that the resettable memory module (5') carries out the function of the second IIR filter stage (12) and of the first FIR filter stage (14) with an IIR filter structure.

* * * * *